United States Patent [19]

Hayakawa et al.

[11] Patent Number: 5,482,262
[45] Date of Patent: Jan. 9, 1996

[54] HYDRAULIC AUTOTENSIONER

[75] Inventors: Hisashi Hayakawa; Kazuki Kawashima; Norio Yamazaki, all of Iwata; Ken Yamamoto, Shizuoka; Satoshi Kitano, Hamakita, all of Japan

[73] Assignee: NTN Corporation, Osaka, Japan

[21] Appl. No.: 310,994

[22] Filed: Sep. 23, 1994

Related U.S. Application Data

[63] Continuation of Ser. No. 992,202, Dec. 17, 1992, abandoned.

[30] Foreign Application Priority Data

Dec. 20, 1991 [JP] Japan .................... 3-105486 U
Nov. 26, 1992 [JP] Japan .................... 4-081724 U

[51] Int. Cl.⁶ .................................................. F16H 7/08
[52] U.S. Cl. ........................ 267/226; 474/138; 474/110
[58] Field of Search ............................ 267/220, 221, 267/223, 224, 226; 188/322.22, 315, 311, 316, 317; 474/104, 110, 138

[56] References Cited

U.S. PATENT DOCUMENTS

| | | | |
|---|---|---|---|
| 4,790,801 | 12/1988 | Schmidt et al. | 474/110 |
| 4,940,447 | 7/1990 | Kawashima et al. | 474/110 |
| 4,950,209 | 8/1990 | Kawashima et al. | 474/110 X |
| 4,976,660 | 12/1990 | Breindl | 474/110 X |
| 4,986,796 | 1/1991 | Kawashima et al. | 474/110 X |

FOREIGN PATENT DOCUMENTS

| | | | |
|---|---|---|---|
| 2144688 | 3/1973 | Germany | 474/110 |
| 2819608 | 11/1979 | Germany | 474/110 |
| 0270932 | 11/1988 | Japan | 188/322.22 |
| 3-239845 | 10/1991 | Japan . | |

*Primary Examiner*—Josie A. Ballato
*Attorney, Agent, or Firm*—Nikaido Marmelstein Murray & Oram

[57] ABSTRACT

A hydraulic autotensioner has a cylinder having a closed bottom end, a sleeve mounted in the cylinder and a plunger slidably mounted in the sleeve. The interior of the cylinder is divided into a reservoir chamber and a pressure chamber by the plunger which is formed with a passage through which the reservoir chamber and the pressure chamber communicate with each other. A check valve is provided in the passage to close the passage if the pressure of hydraulic oil in the pressure chamber increases above the pressure of hydraulic oil in the reservoir chamber. A return spring is mounted in the cylinder to bias a rod which is axially movable together with the plunger in such a direction as to protrude from an upper opening of the cylinder. The return spring is mounted in a space formed between the outer peripheral surface of the sleeve and the inner peripheral surface of the cylinder.

5 Claims, 5 Drawing Sheets

HYDRAULIC AUTOTENSIONER

This application is a continuation of application Ser. No. 07/992,202 filed Dec. 17, 1992, now abandoned.

BACKGROUND OF THE INVENTION

This invention relates to a hydraulic autotensioner for keeping constant the tension of a timing belt for use with an automotive engine.

One known hydraulic autotensioner is shown in FIG. 7. It has a body 1 comprising a cylinder 2 made of a light alloy to reduce the entire weight and a hard sleeve 3 mounted in the cylinder 2. A plunger 4 is slidably mounted in the sleeve 3. A wear ring 6 having a hole 7 that allows the passage of hydraulic oil is press-fitted on a rod 5 which is movable axially together with the plunger 4, and is held in position axially with a shoulder 8 formed on the rod 5. A return spring 9 is mounted between the wear ring 6 and the upper end of the sleeve 3 to bias the rod 5 outwardly.

The interior of the body 1 is partitioned by the plunger 4 into a pressure chamber 10 and a reservoir chamber 11 which communicate with each other through a passage 12 formed in the plunger 4. A check valve 13 is provided near the lower end of the passage 12 leading to the pressure chamber 10.

A retaining ring 14 is fixed to the inner peripheral surface of the body 1 at its upper part to prevent an oil seal 15 having a rod inserting hole from coming out. The oil seal 18 serves to prevent the leakage of hydraulic oil filling the body 1. An air layer is present between the hydraulic oil and the oil seal 15.

In this autotensioner, a pulley arm 16 is pushed up by the rod 5 to press a tension pulley 17 provided at one end of the pulley arm 16 against a belt 18. Thus, a predetermined tension is imparted to a belt 18. The pushing force applied to the rod 5 with variations in tension of the belt 18 is damped as the hydraulic oil in the pressure chamber 10 is compressed by the plunger 4.

As the tension of the belt 18 increases and the rod 5 is pushed in, the check valve 13 is closed and the force transmitted from the belt is borne by the oil pressure. Simultaneously, the hydraulic oil in the pressure chamber 10 is compressed and part of it leaks through a gap between the frictional surfaces of the sleeve and the plunger 4, allowing the rod 5 and the plunger 4 to retract slowly in such a direction as to reduce the tension of the belt.

In contrast, as the belt 18 slackens, the rod 5 and the plunger 4 will move up quickly by the force of the spring 9 in such a direction as to increase the tension of the belt. At the same time, the pressure in the pressure chamber 10 decreases, the check valve 13 opens, and the hydraulic oil in the reservoir chamber 11 flows through the passage 12 into the pressure chamber 10.

In this autotensioner, the tension is applied to the belt 18 by the spring force of the return spring 9. In order to increase the force of the return spring and thus the tension of the belt, both the diameter and the entire length of the return spring 9 have to be increased.

In case of the conventional autotensioner shown in FIG. 7, since the return spring 9 is disposed between the sleeve 3 and the wear ring 6, in order to increase the length of the return spring 9, the entire length of the cylinder 2 has to be increased correspondingly. It is difficult to mount an autotensioner having such a long cylinder on an engine.

On the other hand, if the spring constant of the return spring 9 is increased to increase the spring force instead of increasing the length of the cylinder, it will then become difficult to set the spring force of the return spring within a predetermined range, i.e. the range within which the tension of the belt can be kept at a predetermined value.

Generally, an autotensioner is subjected to a high frequency variable load synchronizing with the engine revolving speed. The load is transmitted from the belt 18. Thus, the rod 5 and the plunger 4 will vibrate microscopically at high speed. Since the vibration of the belt 18 is transmitted through the pivotable pulley arm 16, the rod 5 is pushed in not straight but obliquely. Thus, an edge load acts on an edge 19 of the plunger 4 and the edge 19 is likely to get worn. Also, the inner periphery of the sleeve 5 may get worn unevenly by contact with the edge 19, thus inhibiting smooth sliding movement of the plunger 4. Such an autotensioner cannot function properly.

SUMMARY OF THE INVENTION

A first object of this invention is to provide an autotensioner in which the spring force of the return spring can be set to a sufficiently large value without increasing the length of the cylinder or without changing the spring constant and in which the length of the cylinder can be kept sufficiently short without reducing the spring force.

A second object is to protect the edge of the plunger and the inner peripheral surface of the sleeve against wear.

A third object of the present invention is to provide an autotensioner in which even if the plunger moves rapidly toward the reservoir chamber and the pressure in the pressure chamber drops sharply, the air forming the air layer overlying the hydraulic oil in the reservoir chamber is prevented from flowing through the hole in the wear ring and the passage in the plunger into the pressure chamber.

In order to fulfill the first object, according to the present invention, a space is provided between the outer peripheral surface of the sleeve and the inner peripheral surface of the cylinder and the return spring is mounted in the space.

In order to attain the second object, there is provided a hydraulic autotensioner wherein the plunger has a cylindrical outer surface and has, at a bottom thereof that faces the pressure chamber, a tapered surface connecting with the cylindrical outer surface and an arcuate surface smoothly connecting with the tapered surface, the tapered surface being at an angle of 5–20 degrees with respect to the cylindrical outer surface.

In order to attain the third object, there is provided an autotensioner wherein the wear ring mounted on the rod comprises an annular plate having a through hole which allows the passage of hydraulic oil, a guide sheath provided around the annular ring so as to be guided along the inner peripheral surface of the cylinder, and a boss provided on the inner peripheral surface of the annular plate and supporting the rod.

According to the arrangement of the present invention, the cylinder can be shortened by a length equal to the height of the mounting space of the return spring. Thus, the length of the return spring can be increased without increasing the length of the cylinder. A longer return spring makes it possible to increase the spring force without increasing the spring constant. Thus, the spring constant can be set freely.

Further, by forming the tapered surface and the arcuate surface at the bottom of the plunger so that with the tapered surface at an angle of 5–20 degrees with respect to the outer cylindrical surface of the plunger, an edge load is less likely to act on the corner portion while the engine is in operation. This will serve to reduce the wear on the corner portion of the plunger and the inner peripheral surface of the sleeve.

In the arrangement wherein the wear ring comprises the annular plate and the guide sheath and the boss provided on the outer and inner periphery of the annular plate, the flow resistance through the holes can be reduced without reducing the length of surface to be guided by the cylinder and the length of surface for supporting the rod. Thus, when the plunger is moved quickly toward the reservoir chamber to adjust the tension of the belt, the hydraulic oil present over the wear ring will flow smoothly through the holes. This prevents the air forming the air layer from entering into the reservoir chamber.

BRIEF DESCRIPTION OF THE DRAWINGS

The features and objects of the present invention will become apparent from the following description taken with reference to the accompanying drawings, in which.

DETAILED DESCRIPTION OF THE PREFERRED EMBODIMENTS

Now we shall describe preferred embodiments of this invention with reference to FIGS. 1–6.

Figure 1:
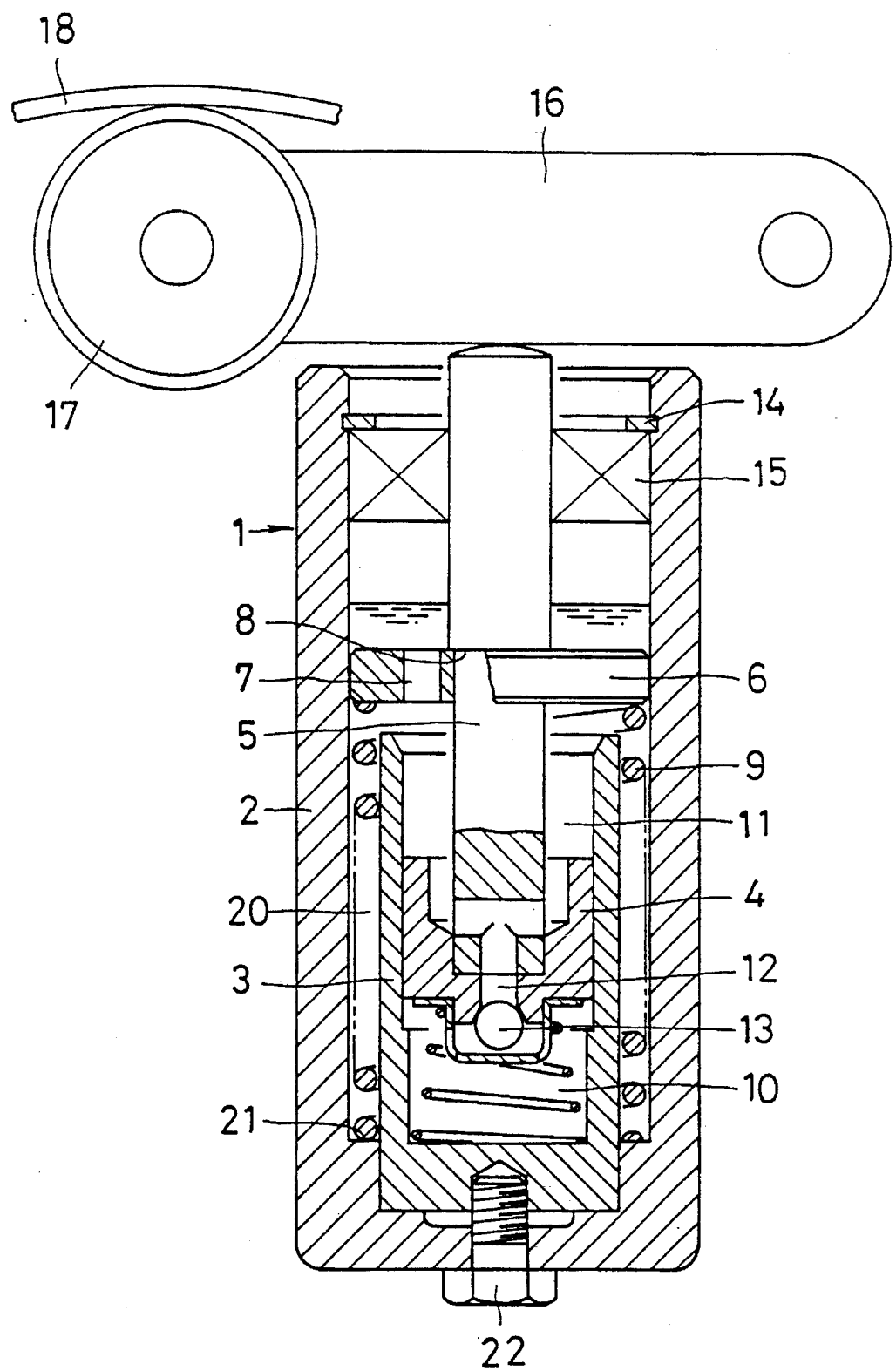
FIG. 1 is a vertical sectional front view showing a first embodiment of the hydraulic autotensioner according to this invention.

FIG. 1 shows a first embodiment of the hydraulic autotensioner according to this invention. It has a body 1 comprising a cylinder 2 and a sleeve 3 mounted in the cylinder. A plunger 4 is slidably mounted in the sleeve 3. A wear ring 6 is secured to a rod 5 which is axially movable together with the plunger 4.

The interior of the body 1 is partitioned by the plunger 4 into a pressure chamber 10 and a reservoir chamber 11 which communicate with each other through a passage 12 formed in the plunger 4. A check valve 13 is provided near the lower end of the passage 12 leading to the pressure chamber 10. In this embodiment, a return spring 9 is mounted in a space 20 defined between the outer peripheral surface of the sleeve 3 and the inner peripheral surface of the cylinder 2.

The return spring 9 has one end thereof in engagement with a shoulder 21 formed on the inner periphery of the cylinder 2 and the other end in engagement with a wear ring 6 fixed to the rod 5 so as to bias the rod 5 outwardly.

In this figure, the sleeve 3 is secured to the closed end of the cylinder 2 by tightening a bolt 22. However, the bolt may be omitted.

By mounting the return spring 9 in the space 20, the length of the cylinder can be shortened by a length equal to the height of the mounting space 20. Thus, the force of the return spring 9 can be increased to a level required for use in an autotensioner without increasing the length of the cylinder or while keeping it sufficiently short. For example, the axial length of the cylinder 2 shown in FIG. 1 can be about 70% shorter than that of the prior art cylinder.

Also, since the return spring 9 may have a larger length, its spring constant can be set to a smaller value. This makes it possible to set the spring force to a value precisely corresponding to the required belt tension.

Figure 2:
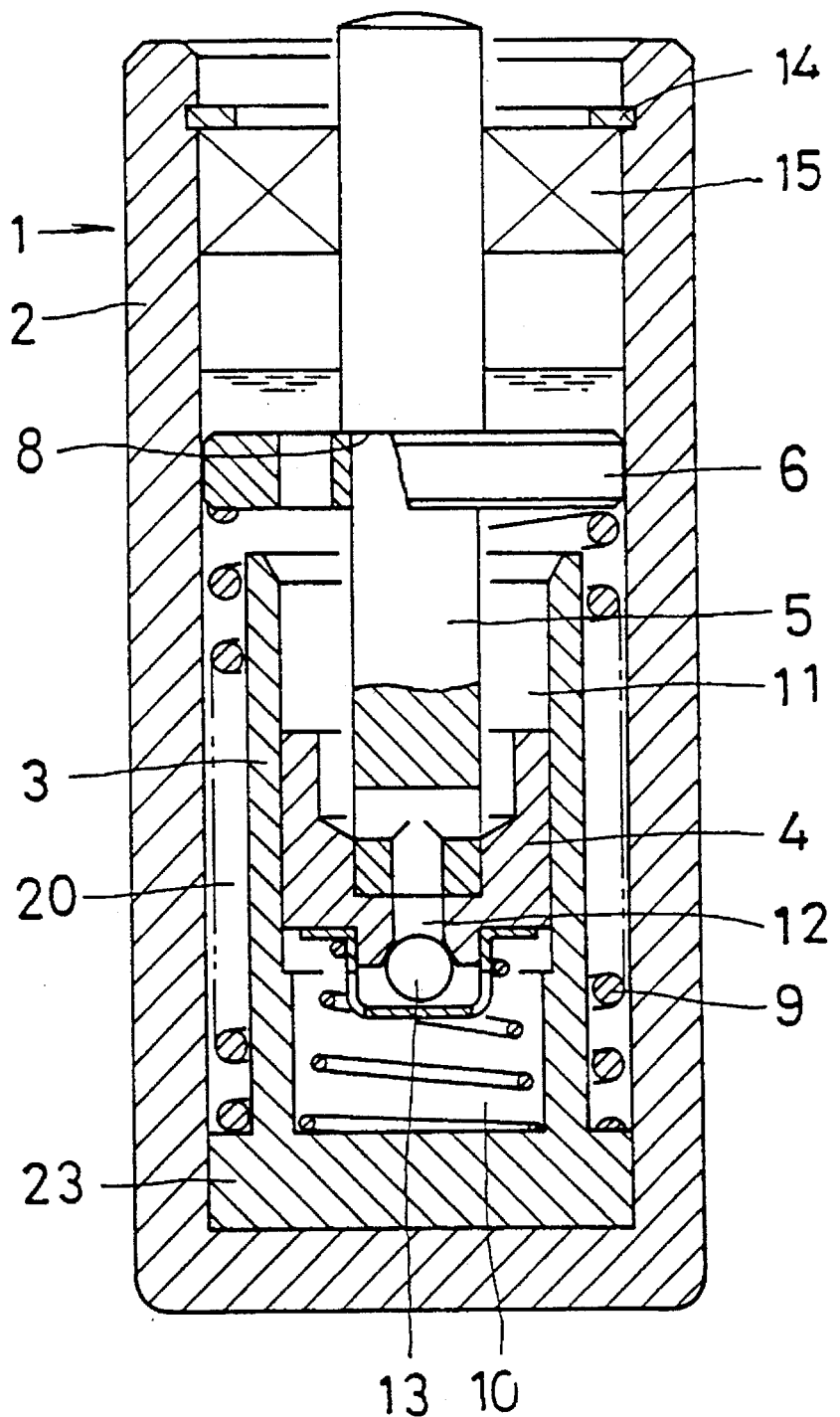
FIG. 2 is a similar view showing a second embodiment.

FIG. 2 shows a second embodiment of the hydraulic autotensioner according to this invention. In this embodiment, a flange 23 is formed on the sleeve 3 around the lower end thereof. A return spring 9 is disposed between the flange 23 and the wear ring 6.

In this embodiment, since the sleeve 3 is kept pressed against the closed end of the cylinder 2 by the return spring 9, it cannot move axially. Thus, the bolt 22 shown in FIG. 1 can be omitted.

By omitting the bolt 22, there is no need to form a bolt hole in the bottom of the sleeve 3.

Figure 3:
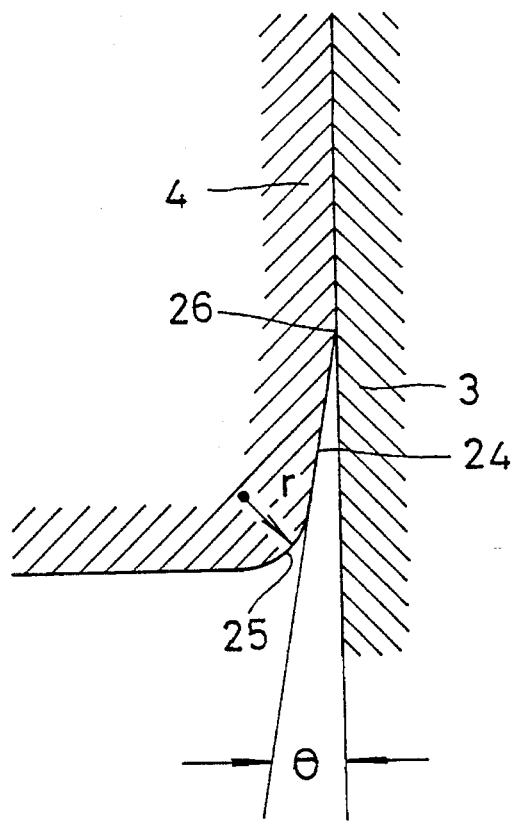
FIG. 3 is an enlarged sectional view of a part of the plunger of the second embodiment.

FIG. 3 shows an enlarged view of the plunger 4 inserted in the sleeve 3. The bottom corner portion of the plunger 4, which faces the pressure chamber 10, comprises a tapered surface 24 connecting with the outer cylindrical surface of the plunger 4 and an arcuate surface 25 smoothly connecting with the bottom end of the tapered surface 24.

The tapered surface 24 connects the outer cylindrical surface of the plunger at an angle of 5–20 degrees, The arcuate surface 25 has a radius of curvature of 0.5–1.0 mm.

As described above, by forming the tapered surface 24 and the arcuate surface 25 on the bottom corner portion of the plunger 4 and by providing the tapered surface 24 at such an angle with respect to the cylindrical surface of the plunger, the angle of an edge 26 provided at the intersection between the outer cylindrical surface of the plunger and the tapered surface 24 is large, so that an edge load is less likely to be produced while the engine is in operation. This will serve to reduce the wear of the plunger at its corner portion.

Even if the inner peripheral surface of the sleeve 3 should get worn due to high-frequency vibration transmitted to the plunger 4 while the engine is in operation, the wear will be uniform, so that the plunger 4 can slide smoothly.

The tapered surface 24 and the arcuate surface 25 may be formed on the upper corner portion of the plunger 4.

Figure 4:
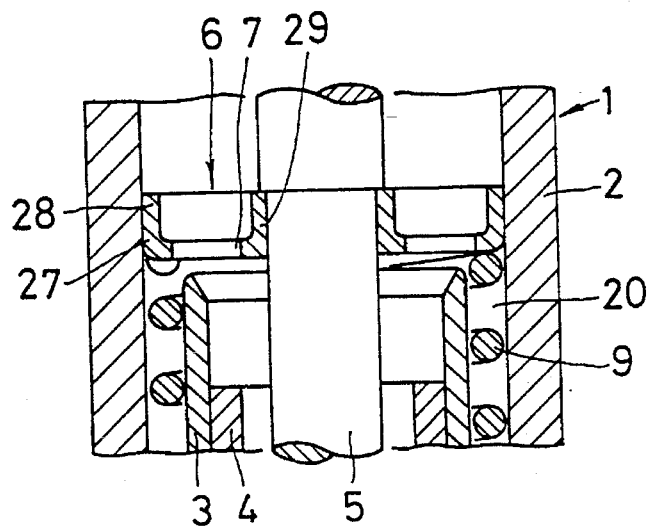
FIG. 4 is a sectional view showing a third embodiment.
Figure 5:
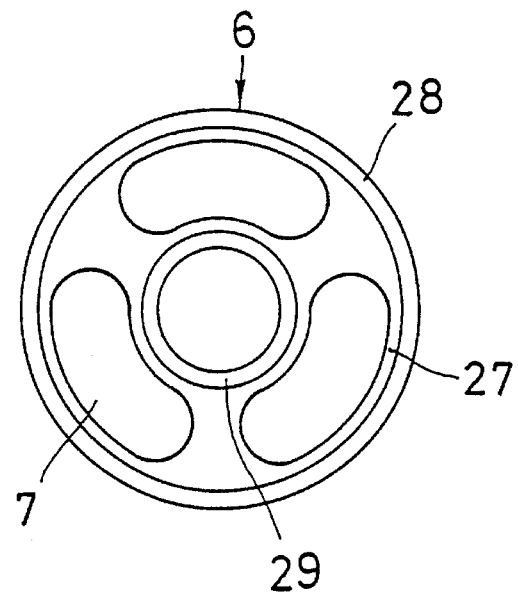
FIG. 5 is a plan view of the wear ring of the second embodiment.

FIGS. 4 and 5 show a third embodiment of the autotensioner according to this invention. In this embodiment, the wear ring 6 comprises an annular plate 27 having through holes 7, a guide sheath 28 provided at an outer periphery thereof so as to be slidably guided along the inner peripheral surface of the cylinder 2 and a boss 29 provided at inner periphery thereof to support the rod 5.

The wear ring 6 bears the bending moment that acts on the rod 5 and also serves as a bearing for guiding the axial movement of the rod 5. If, therefore, the wear ring 6 were made of a thin disk member, it might be deformed by the bending moment that acts on the rod 5 and is more likely to be worn because of the small contact area with the cylinder. This will hamper its functioning as a bearing.

Thus, in the first and second embodiments, the wear ring 6 is made from a relatively thick disk to increase the length of surface to be guided along the inner peripheral surface of the cylinder 2 and the length of surface supporting the rod 5. The disk has a rod inserting hole and oil flow holes 7.

One problem with the wear ring 6 in the form of a thick disk is that hydraulic oil tends to encounter rather a large resistance when it flows through the holes 7. Thus, when the plunger 4 is moved quickly toward the reservoir chamber 11 to adjust the tension of the belt, the hydraulic oil present over the wear ring 6 will not flow smoothly through the holes 7, so that the air forming the air layer may be drawn into the reservoir chamber 11 together with the hydraulic oil. The air drawn into the reservoir chamber 11 will pose no problem as long as it stays in the reservoir chamber 11. But, once it flows into the pressure chamber 10 through the passage 12 in the plunger 4, it will lower the damping action of the autotensioner.

In the third embodiment, since the wear ring 6 comprises the annular plate 27 and the guide sheath 28 and the boss 29 provided at the outer and inner periphery of the annular plate 27, respectively, the flow resistance through the holes 7 can be reduced without reducing the length of the surface to be guided by the cylinder 2 and the length of the surface for supporting the rod 5. Thus, when the plunger 4 is moved quickly toward the reservoir chamber 11 to adjust the tension of the belt, the hydraulic oil present over the wear ring 6 will flow smoothly through the holes 7. This prevents the air forming the air layer from entering into the reservoir chamber 11.

The greater the size of the holes 7, the better the flowability of the hydraulic oil. However, holes that are too large will lessen the rigidity of the annular plate 27. Preferably, the area ratio of the holes to the entire surface of the annular plate should be 40-70%.

Figure 6:
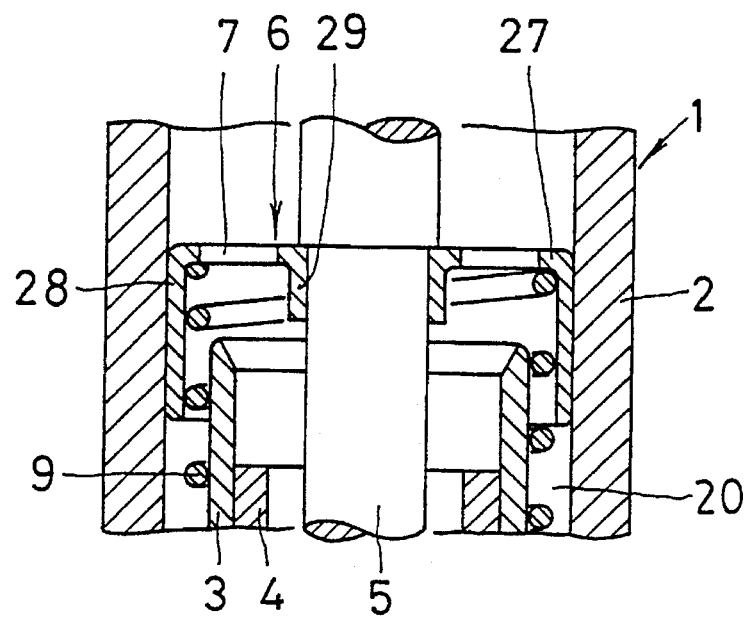
FIG. 6 is a sectional view of a fourth embodiment.
Figure 7:
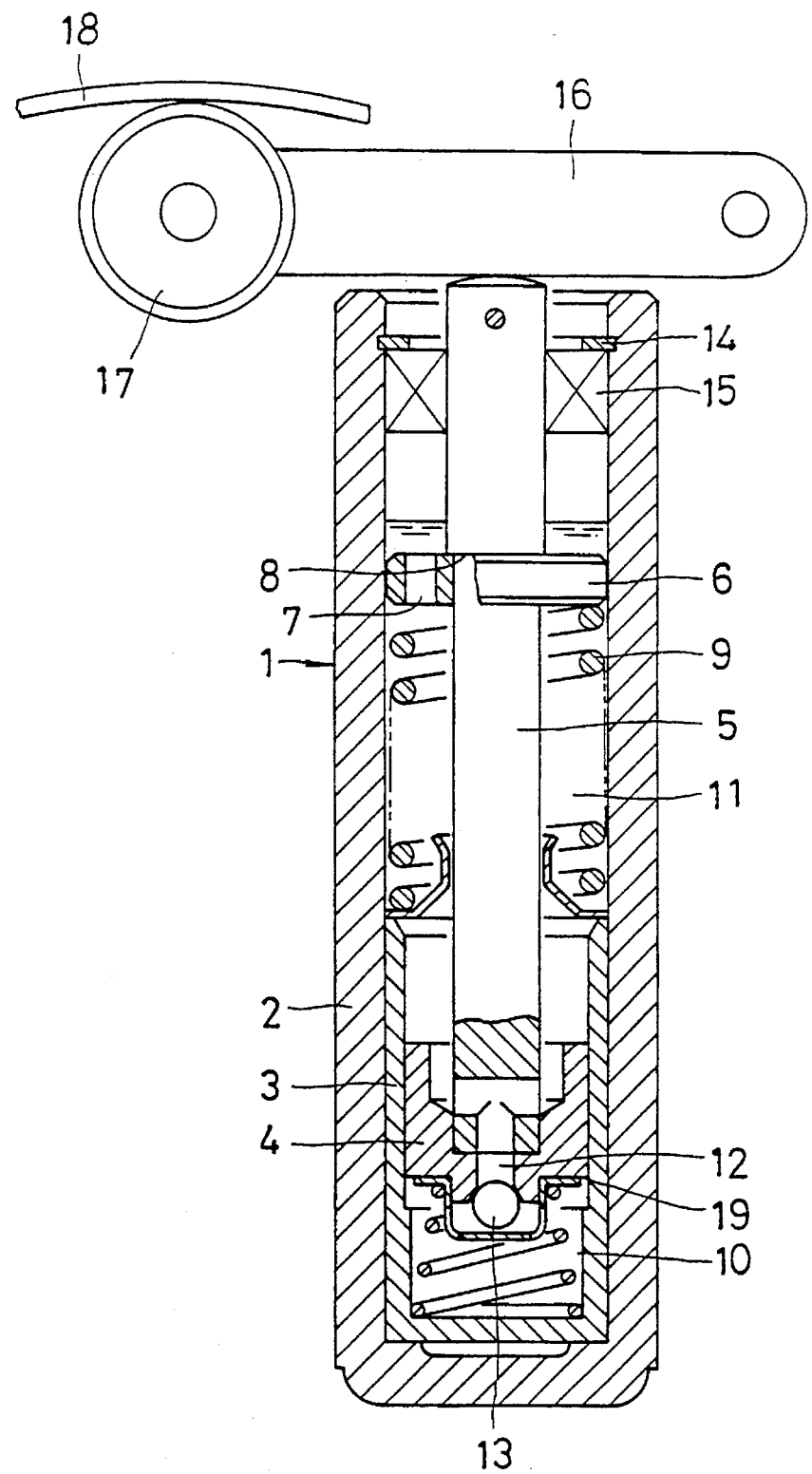
FIG. 7 is a vertical sectional front view of a prior art hydraulic autotensioner.

The wear ring 6 may be mounted with the guide sheath 28 and the boss 29 extending downwardly as shown in FIG. 6.

What is claimed is:

1. A hydraulic autotensioner comprising a cylinder having a closed bottom end, a sleeve mounted in said cylinder, a plunger slidably mounted in said sleeve to define a reservoir chamber and a pressure chamber, said plunger being formed with a passage through which said reservoir chamber and said pressure chamber communicate with each other, a check valve provided in said passage for closing said passage when the pressure of hydraulic oil in said pressure chamber increases above the pressure of hydraulic oil in said reservoir chamber, a rod axially movable together with said plunger, a return spring for biasing said rod in such a direction as to protrude from an upper opening of said cylinder, a wear ring having a hole which allows the passage of hydraulic oil therethrough and mounted on said rod so as to be guided along an inner peripheral surface of said cylinder, said return spring being mounted in a spring mounting space defined between the outer peripheral surface of said sleeve and the inner peripheral surface of said cylinder, said wear ring having a larger outer diameter than the outer diameter of said sleeve, said spring mounting space extending downward beyond said passage.

2. A hydraulic autotensioner as claimed in claim 1 wherein said wear ring comprises an annular plate formed with said hole, a guide sheath provided at the outer periphery of said annular plate so as to be guided along the inner peripheral surface of said cylinder, and a boss provided at the inner periphery of said annular plate for supporting said rod.

3. A hydraulic autotensioner comprising a cylinder having a closed bottom end; a sleeve mounted in said cylinder; a plunger slidably mounted in said sleeve to define a reservoir chamber and a pressure chamber, said plunger being formed with a passage through which said reservoir chamber and said pressure chamber communicate with each other; a check valve provided in said passage for closing said passage if a pressure of hydraulic oil in said pressure chamber increases above the pressure of hydraulic oil in said reservoir chamber; a rod axially movable together with said plunger; a return spring for biasing said rod in such a direction as to have said rod protrude from an upper opening in said cylinder, said return spring being mounted in a space defined between the outer peripheral surface of said sleeve and the inner peripheral surface of said cylinder; and wherein said plunger has a cylindrical outer surface and has at bottom thereof that faces said pressure chamber a tapered surface connecting with said cylindrical outer surface and an arcuate surface smoothly connecting with said tapered surface, said tapered surface being at an angle of 5-20 degrees with respect to said cylindrical outer surface.

4. An autotensioner as claimed in claim 3 further comprising a wear ring that allows the passage of hydraulic oil therethrough and mounted on said rod so as to be guided along the inner peripheral surface of said cylinder, said wear ring comprising an annular plate having a through hole which allows the passage of hydraulic oil, a guide sheath provided at the outer periphery of said annular plate so as to be guided along the inner peripheral surface of said cylinder, and a boss provided at the inner periphery of said annular plate for supporting said rod.

5. A hydraulic autotensioner comprising a cylinder having a closed bottom end; a sleeve mounted in said cylinder to define a reservoir chamber and a pressure chamber; a plunger being formed with a passage through which said reservoir chamber and said pressure chamber communicate with each other; a check valve provided in said passage for closing said passage if a pressure of hydraulic oil in said pressure chamber increases above a pressure of hydraulic oil in said reservoir chamber; a rod axially movable together with said plunger; a return spring for biasing said rod in such a direction as to protrude from an upper opening in said cylinder; and a wear ring having a hole through which hydraulic oil flows and mounted on said rod so as to be guided along an inner peripheral surface of said cylinder; a spring mounting space being defined between an outer peripheral surface of said sleeve and the inner peripheral surface of said cylinder, said return spring being mounted in said spring mounting space; said wear ring having an outer diameter larger than an outer diameter of said sleeve; and wherein said plunger has a cylindrical outer surface and has a bottom thereof that faces said pressure chamber, a tapered surface connecting with said cylindrical outer surface and an arcuate surface smoothly connecting with said tapered surface, said tapered surface being at an angle of 5-20 degrees with respect to said cylindrical outer surface.

* * * * *